United States Patent
Krishnan et al.

(10) Patent No.: US 11,169,893 B2
(45) Date of Patent: Nov. 9, 2021

(54) RESERVING FAILOVER CAPACITY IN CLOUD COMPUTING

(71) Applicant: VMWARE, INC., Palo Alto, CA (US)

(72) Inventors: Manoj Krishnan, Thrissur (IN); Gabriel Tarasuk-Levin, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 167 days.

(21) Appl. No.: 16/507,083

(22) Filed: Jul. 10, 2019

(65) Prior Publication Data

US 2020/0042411 A1     Feb. 6, 2020

(30) Foreign Application Priority Data

Jul. 31, 2018   (IN) .............................. 201841028753

(51) Int. Cl.
*G06F 11/20*     (2006.01)

(52) U.S. Cl.
CPC ...... *G06F 11/2025* (2013.01); *G06F 2201/85* (2013.01)

(58) Field of Classification Search
CPC ......... G06F 9/45558; G06F 2009/4557; G06F 11/203; G06F 11/2025; G06F 11/2028; G06F 11/2033; G06F 11/07; G06F 11/0709; G06F 11/0712; G06F 2201/85
See application file for complete search history.

(56) References Cited

U.S. PATENT DOCUMENTS

| | | | |
|---|---|---|---|
| 8,433,802 B2 * | 4/2013 | Head | G06F 9/5088 709/226 |
| 8,874,749 B1 | 10/2014 | Villal et al. | |
| 10,148,493 B1 * | 12/2018 | Ennis, Jr. | G06F 9/541 |
| 10,608,942 B1 | 3/2020 | Shaikh | |
| 2009/0055507 A1 * | 2/2009 | Oeda | G06F 9/4856 709/216 |
| 2009/0119664 A1 * | 5/2009 | Pike | G06F 9/45558 718/1 |
| 2013/0044641 A1 | 2/2013 | Koponen et al. | |
| 2015/0100958 A1 | 4/2015 | Banavalikar et al. | |

(Continued)

OTHER PUBLICATIONS

S. Loveland, E. M. Dow, F. LeFevre, D. Beyer and P. F. Chan, "Leveraging virtualization to optimize high-availability system configurations," in IBM Systems Journal, vol. 47, No. 4, pp. 591-604, Publication on 2008, doi: 10.1147/SJ.2008.5386515.*

(Continued)

*Primary Examiner* — Matthew M Kim
*Assistant Examiner* — Kurosu Risa Altaf
(74) *Attorney, Agent, or Firm* — Dentons US LLP

(57) ABSTRACT

Methods and devices for providing reserved failover capacity across a plurality of data centers are described herein. An exemplary method includes determining whether a management process is executing at a first data center corresponding to a first physical location. In accordance with a determination that the management process is not executing at the first data center corresponding to the first physical location a host is initiated at a second data center corresponding to a second physical location and the management process is executed on the initiated host at the second data center corresponding to the second physical location.

36 Claims, 5 Drawing Sheets

After Failure Condition Detection

(56) References Cited

U.S. PATENT DOCUMENTS

| | | | |
|---|---|---|---|
| 2015/0237132 A1* | 8/2015 | Antony | H04L 67/1095 |
| | | | 709/224 |
| 2015/0355982 A1* | 12/2015 | Ganesan | G06F 9/45558 |
| | | | 714/4.11 |
| 2017/0168903 A1* | 6/2017 | Dornemann | G06F 9/45558 |
| 2017/0177840 A1* | 6/2017 | Srivastava | G06F 9/5072 |
| 2018/0173554 A1* | 6/2018 | CaraDonna | G06F 11/07 |
| 2019/0108099 A1 | 4/2019 | Mazumdar | |
| 2020/0044966 A1 | 2/2020 | Krishnan et al. | |

OTHER PUBLICATIONS

Zhi Chen, Xiaolin Chang, Zhen Han, Lin Li, Survivability Modeling and Analysis of Cloud Service in Distributed Data Centers, The Computer Journal, Advance Access Publication on Dec. 4, 2017, https://doi.org/10.1093/comjnl/bxx116.*

Non-Final Office Action received for U.S. Appl. No. 16/507,081, dated May 12, 2021, 21 pages.

* cited by examiner

Before Failure Condition Detection

After Failure Condition Detection

Before Failure Condition Detection

After Failure Condition Detection

RESERVING FAILOVER CAPACITY IN CLOUD COMPUTING

RELATED APPLICATIONS

Benefit is claimed under 35 U.S.C. 119(a)-(d) to Foreign Application Serial No. 201841028753 filed in India entitled "RESERVING FAILOVER CAPACITY IN CLOUD COMPUTING", on Jul. 31, 2018, by VMWARE, INC., which is herein incorporated in its entirety by reference for all purposes.

FIELD

The present disclosure relates generally to cloud computing, and more specifically to the reservation of failover capacity across a plurality of data centers in a cloud computing environment.

BACKGROUND

Cloud architectures are used in cloud computing and cloud storage systems for offering infrastructure-as-a service (IaaS) cloud services. Examples of cloud services include the VMware vCloud, Amazon AWS, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

SUMMARY

Some cloud computing architectures use data centers to provide cloud resources. For example, data centers can provide hardware resources that support executing computing processes. In some instances, it is desirable for hosts, VMs, and/or processes to communicate between data centers. For example, if a VM, host, or a data center fails (e.g., due to a power outage, hardware fault, etc.), it is desirable that the process(es) supported by the failed data center be supported by another data center to provide fault tolerance and preservation of process availability. Thus, providing for the initiation of failed processes between data centers can result in improved fault tolerance and process availability.

In some examples, a method for providing reserved failover capacity across a plurality of data centers is described. The method comprises determining whether a management process is executing at a first datacenter corresponding to a first physical location. In accordance with a determination that the management process is not executing at the first data center corresponding to the first physical location, initiating a host at a second data center corresponding to a second physical location and then executing the management process on the initiated host at the second data center corresponding to the second physical location.

Figure 1:
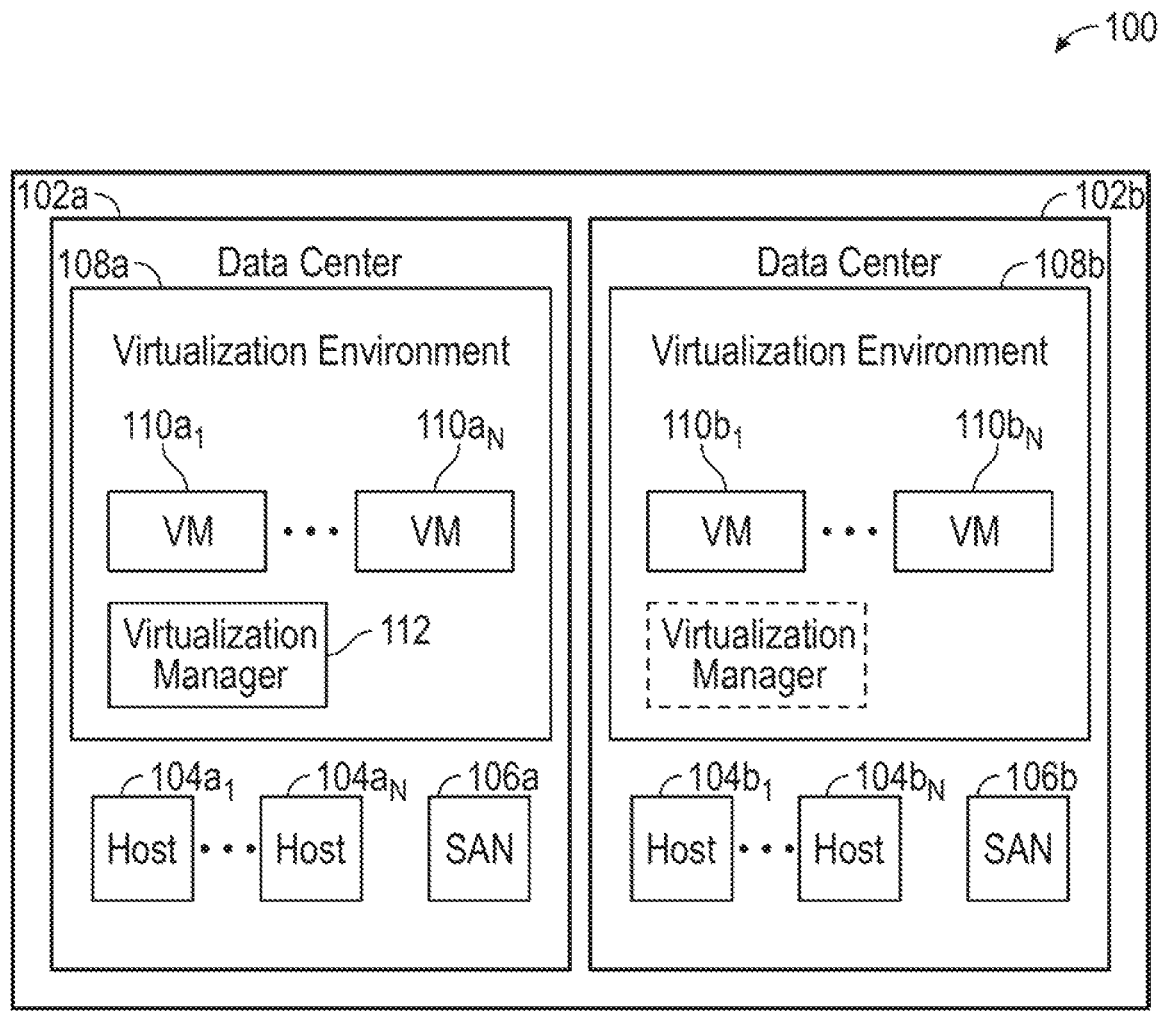
FIG. 1 is a block diagram illustrating an exemplary cloud computing system.

Examples of the present disclosure and their advantages are best understood by referring to the detailed description that follows. It should be appreciated that like reference numerals are used to identify like elements illustrated in one or more of the figures, wherein showings therein are for purposes of illustrating examples of the present disclosure and not for purposes of limiting the same.

DETAILED DESCRIPTION OF THE DISCLOSURE

Certain details are set forth below to provide a sufficient understanding of various examples of the invention. However, it will be clear to one skilled in the art that examples of the invention may be practiced without one or more of these particular details. Moreover, the particular examples of the present invention described herein are provided by way of example and should not be used to limit the scope of the invention to these particular examples. In other instances, hardware components, network architectures, and/or software operations have not been shown in detail in order to avoid unnecessarily obscuring the invention.

FIG. 1 is a block diagram illustrating an exemplary cloud computing system 100. Cloud computing system includes data centers 102a and 102b. In some examples, data centers 102a, 102b are each configured to provide a virtualization environment. Although FIG. 1 depicts cloud computing system 100 as including two data centers (i.e., 102a and 102b), it is to be understood that cloud computing system 100 can include any number of data centers (e.g., a single data center, more than two data centers).

In some examples, each data center 102a, 102b corresponds to one or more physical data centers for a particular location or region. In this manner, each data center 102a, 102b may comprise an availability zone (AZ), for instance, for a particular region. Thus, an availability zone for a particular region comprises a distinct (e.g., from the other availability zones of the region) location served by one or more distinct data centers. In some examples, one or more availability zones of a region provide redundancy for the region. Availability zones may be fully redundant with one or more other availability zones and/or may be partially redundant with one or more other availability zones. It will be appreciated that providing redundancy in this manner provides high availability of both data and resources in a cloud computing environment.

In some examples, each data center 102a, 102b provides resources to the cloud computing system 100. Resources provided in this manner include, but are not limited to, processing (e.g., computational), network, memory, and/or storage resources.

By way of example, data center 102a may include one or more hosts $104a_1$-$104a_N$. Each host $104a_1$-$104a_N$ comprises, for instance, a designated amount of processing, network, memory and/or storage resources. In some examples, hosts $104a_1$-$104a_N$ are configured to provide a same amount of resources, and in other examples, hosts $104a_1$-$104a_N$ are configured to provide different amounts of resources, respectively. Data center 102a further includes storage area network (SAN) 106a. SAN 106a is configured to provide storage resources. While description is made herein with respect to the operation of the hosts $104a_1$-$104a_N$ and SAN 106a of data center 102a, it will be appreciated that those of hosts $104b_1$-$104b_N$ and SAN 106b of data center 102b provide analogous functionality. Exemplary components of a host (e.g., any of hosts 104a or hosts 104b) are described below with respect to FIG. 2.

Data center 102a further includes a virtualization environment 108a that, in some examples, is provided using the hardware resources (e.g., hosts $104a_1$-$104a_N$ and/or SAN 106a). Virtualization environment 108a includes virtualization manager 112 and a plurality of virtual machines (VMs) $110a_1$-$110a_N$.

In some examples, one or more of the hosts $104a_1$-$104a_N$ are configured to execute a hypervisor by which resources of a respective host are shared amongst virtual machines (VMs) corresponding to the host. In some examples, the hypervisor is a type 1 hypervisor. Accordingly, the hypervisor may be implemented directly on the hardware components of a host as a hardware virtualization engine. In other examples, the hypervisor is a type 2 hypervisor. Accordingly, the hypervisor may execute in combination with other software (e.g., operating system) of the host. For instance, in some examples, the hypervisor is a VMware ESXi hypervisor provided as part of the VMware vSphere solution made commercially available from VMware Inc.

In some examples, virtualization manager 112 is configured to manage hosts and/or virtual machines of the virtualization environment 108a. In some examples, managing virtual machines in this manner includes instantiating, removing, and/or migrating virtual machines, as well optimizing the allocation of resources to the virtual machines during operation. By way of example, if resource demands exceed a current capability of hosts of the data center 102a, virtualization manager 112 can request that one or more additional hosts be injected into the cluster of hosts. Virtualization manager 112 can then initiate a specific number of VMs 110a on the injected host of data center 102a to provide one or more services using the newly allocated resources. In some examples, virtualization manager 112 monitors resource consumption levels and adjusts the amount of available resources as needed. In some examples, virtualization manager 112 further carries out administrative tasks for data center 102a, such as load balancing between hosts, enforcing various policies, and/or updating host firmware and software.

In some examples, virtualization manager 112 is implemented as a process running on a VM (e.g., any one of VMs $110a_1 \ldots 110a_N$ or $110b_1 \ldots 110b_N$). In some examples, virtualization manager 112 is a process that executes on a server (e.g., host) of cloud computing system 100 (not shown) separate from hosts 104a and 104b. An exemplary virtualization manager is the vCenter™ Server product made commercially available by VMware, Inc. It will be recognized that any suitable virtualization manager may be used to implement virtualization manager 112.

Further, although FIG. 1 depicts that management process 112 is implemented within data center 102a, it is to be understood that virtualization manager 112 can be implemented within any data center of cloud computing system 100, such as data center 102b. Similarly, in some examples, the management capabilities of virtualization manager 112 are not limited to the data center in which the virtualization manager is implemented. For example, in some examples, virtualization manager 112 additionally manages hosts and/ or virtual machines of other data centers, such as data center 102b (e.g., by managing VMs 110b on hosts 104b). In some examples, virtualization manager 112 carries out tasks (e.g., administrative tasks) for the entire cloud computing system 100.

In some examples, multiple instances of virtualization manager 112 are simultaneously executing in the cloud computing environment 100. For instance, one or more failover instances of the virtualization manager 112 are provided for process redundancy. In this manner, if the virtualization manager 112 fails (e.g., due to VM failure, host failure, or data center failure), a redundant instance of the virtualization manager may assume operation on behalf of the failed instance. In some examples, one or more failover instances are implemented within the same data center. For example, if virtualization manager 112 is implemented as a process running on VM $110a_1$, a failover instance of virtualization manager 112 (not shown) can be implemented as a process running on VM $110a_N$. In some examples, one or more failover instances are implemented within a data center different from the data center of virtualization manager 112. For example, if virtualization manager 112 is implemented as a process running on VM $110a_1$, a failover instance of virtualization manager 112 (not shown) can be implemented as a process running on VM $110b_1$.

In some examples, the virtualization manager 112 is migrated between hosts. In some examples, a VM executing the virtualization manager 112 is migrated between hosts, and as a result, virtualization manager 112 is migrated between hosts. Virtualization manager 112 can be migrated in this manner between hosts of the same data center, or between hosts of different respective data centers. For example, if virtualization manager 112 is implemented as a process running on VM $110a_1$ on host $104a_1$, VM $110a_1$ can be migrated to host $104a_N$ or to host $104b_1$ such that virtualization manager 112 is implemented as a process running on host $104a_N$ or to host $104b_1$, respectively.

Figure 2:
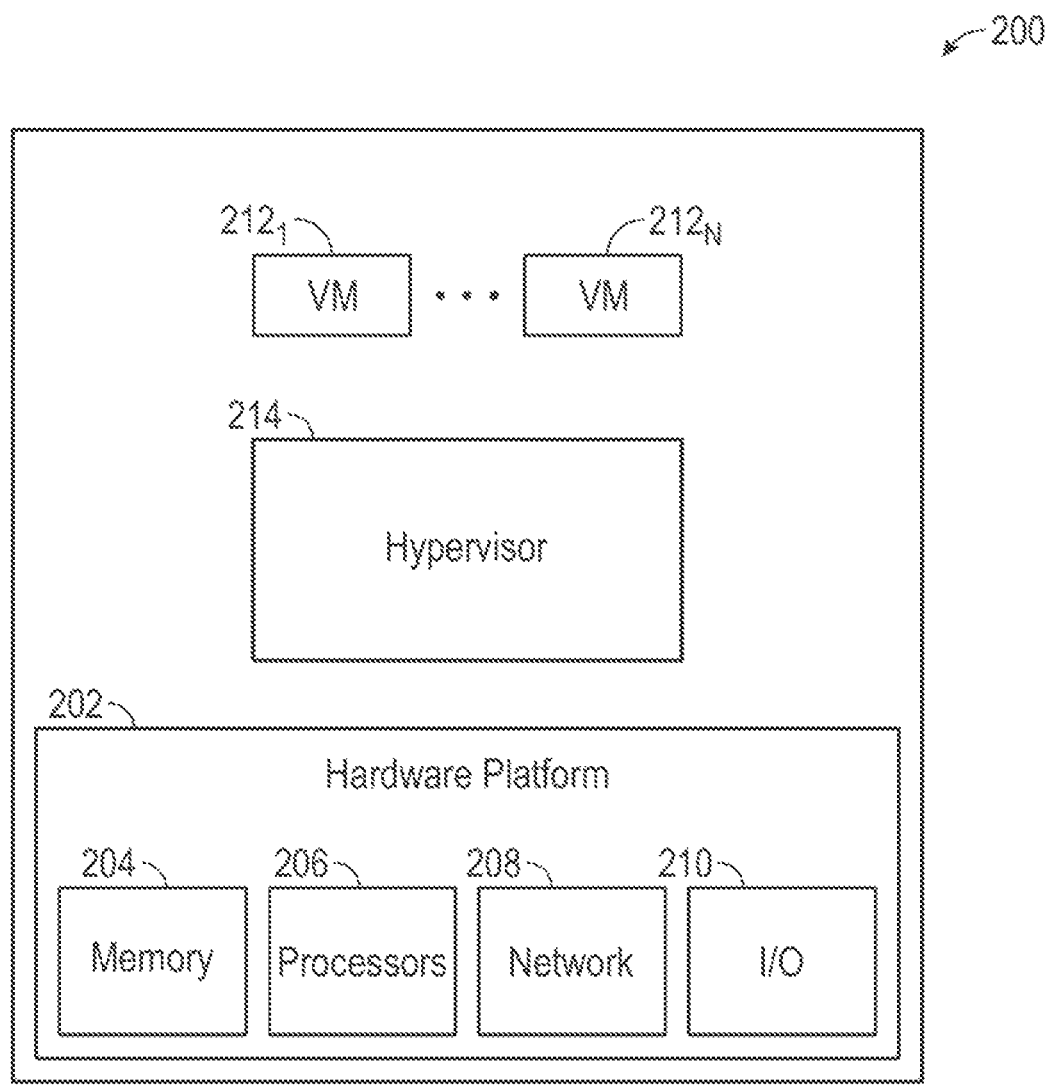
FIG. 2 is a block diagram illustrating an exemplary host.

Turning now to FIG. 2, an exemplary block diagram illustrating an exemplary host 200 is depicted. In some examples, one or more of hosts $104a_1 \ldots 104a_N$ and $104b_1 \ldots 104b_N$ are implemented using host 200.

Host 200 includes hardware platform 202 including memory 204, one or more processors 206, network interface 208, and various I/O devices 210. Memory 204 includes random access memory (RAM), including but not limited to volatile RAM (e.g., DRAM, SRAM) and non-volatile RAM (e.g., NAND). Memory 204 further includes computer-readable storage media. The computer-readable storage media is, for example, tangible and non-transitory. By way of example, memory 204 includes high-speed random access memory and also includes non-volatile memory, such as one or more magnetic disk storage devices, flash memory devices, or other non-volatile solid-state memory devices. In some examples, the computer-readable storage medium of memory 204 stores instructions for performing the methods and processes described herein. In some examples, hardware platform 202 also includes other components, including power supplies, internal communications links and busses, peripheral devices, controllers, and many other components.

In some examples, hypervisor 214 executes using one or more components of hardware platform 202. Hypervisor 214 is a software layer that provides an execution environment within which multiple VMs $212_1 \ldots 212_N$ are concurrently executed. The execution environment of each VM 212 includes virtualized components analogous to those comprising hardware platform 202 (e.g. a virtualized processor(s), virtualized memory, etc.). In this manner, hypervisor 214 provides an intermediate layer between VMs 212 and hardware platform 202, while enabling VMs 212 to share the physical resources of hardware platform 202. As a result of this abstraction, each VM 212 operates as though it has its own dedicated computing resources.

Figure 3A:
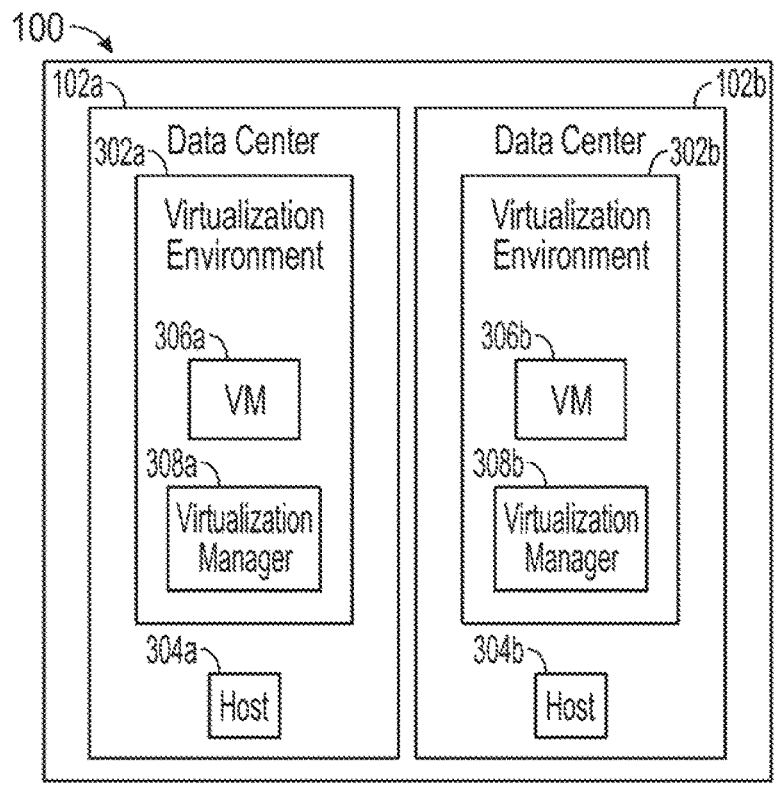
FIGS. 3A and 3B are block diagrams illustrating an allocation of resources before and after a failure condition.
Figure 3B:
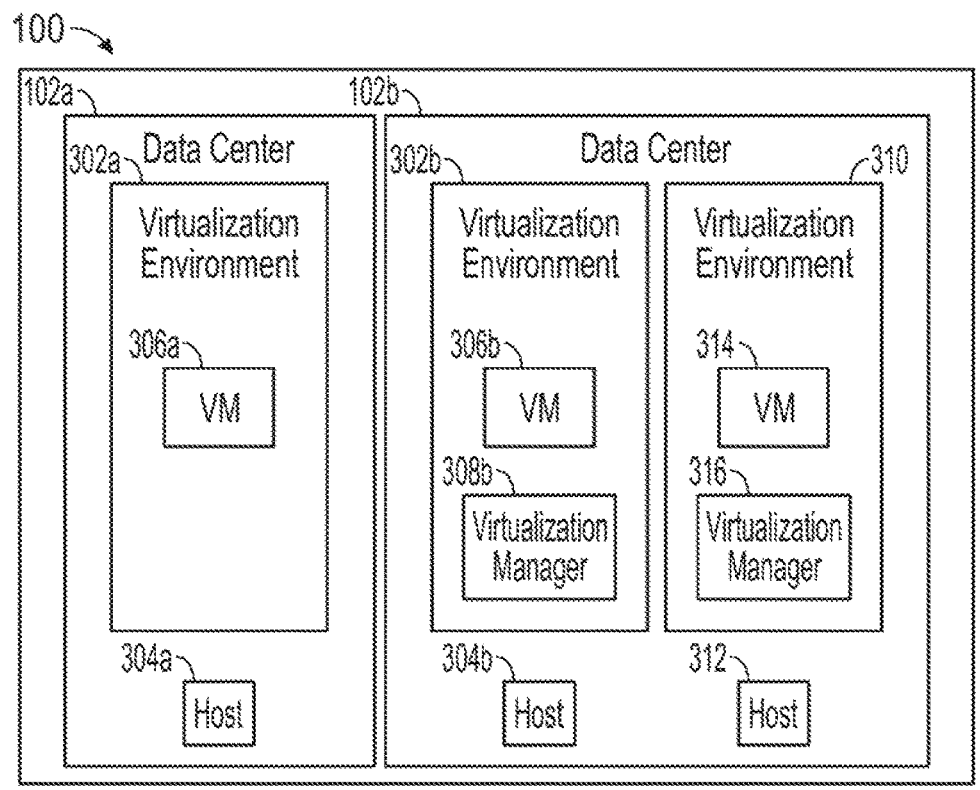

Turning now to FIGS. 3A and 3B, a block diagram illustrating an exemplary allocation of resources before and after a failure condition is detected is depicted. Although FIGS. 3A and 3B depict two data centers 102a, 102b, one of skill in the art will understand that the below discussion may apply to any number of data centers.

In some examples, a cloud computing environment, such as the cloud computing environment 100 (FIG. 1), employs multiple data centers located in different physical locations, respectively. In some examples, each data center employs a virtualization manager (e.g., virtualization manager 308a) to manage hosts of the data center and the VMs executing on the hosts. For example, data center 102a, located at one physical location, includes host 304a on which VM 306a and virtualization manager 308a are executed, and data center 102b, located at a different physical location, includes host 304b on which VM 306b and virtualization manager 308b are executed. In some examples, each data center is associated with a different availability zone. For example, data center 102a is associated with a first availability zone and data center 102b is associated with a second availability zone. In some examples, virtualization managers 308a and 308b are configured to execute in a virtual private cloud. In some examples, cloud computing environment 100 is a virtual private cloud.

Generally, during operation of cloud computing environment 100, it is desirable to maximize the uptime of one or more instances of a virtualization manager in order to allow continued access to the services provided by various VMs. Accordingly, an availability manager (e.g., an availability management process) of the cloud computing environment 100 accounts for a variety of possible failure conditions that may occur during operation. In some examples, the availability manager is executed on a VM of cloud computing system 100, such as VM 306b. In some examples, the availability manager is executed on a server (e.g., a host) of cloud computing system 100 separate from the data centers shown (e.g., data centers 102a and 102b). In some examples, multiple instances of the availability manager are simultaneously executing in the cloud computing environment 100. While description is made herein with respect to the availability manager performing one or more operations, it will be appreciated that such functionality may be implemented using any process(es) executing in the cloud computing environment 100.

In some cases, a virtualization manager, such as virtualization manager 308a of data center 102a, may cease executing, for instance, due to a failure condition (e.g., failure event). Failure conditions include but are not limited to, a loss of network connectivity, a stall (e.g., process failure) of the virtualization manager or a virtual machine, a host failure, or a failure of an entire data center at which the virtualization manager executes (e.g., due to power failure). When the availability manager detects a failure condition, the availability manager determines that a new instance of a virtualization management process, for example virtualization manager 316, is to be executed to ensure that an instance of a virtualization manager remains executing in cloud computing environment 100. In some examples, the availability manager identifies a different data center of cloud computing environment 100 for execution of the virtualization manager, for example, data center 102b.

In some examples, the availability manager may attempt to execute virtualization manager 316 on currently available resources of the data center, such as host 304b. In some examples, executing virtualization manager 316 on currently available resources includes, executing virtualization manager 316 on a previously initiated VM at data center 102b, such as VM 306b.

However, in some examples, host 304b may lack adequate resources to execute virtualization manager 316. Thus, the availability manager may recognize that there is a need for additional resources such that virtualization manager 316 can properly execute. To satisfy the need for additional resources, the availability manager may request additional resources at data center 102b, thereby initiating host 312. In some examples, the amount of resources allocated may match the capacity required for execution of virtualization manager 316. In other examples, the amount of resources allocated may exceed the capacity required for execution of virtualization manager 316.

Initiating host 312 may further include initiating one or more virtual machines, such as VM 314. In some examples, the virtual machines initiated on host 312 may correspond to one or more failed VMs of host 304a. For example, VM 314 of data center 102b may correspond to failed VM 306a of data center 102a. In this way, initiating host 312 also includes initiating one or more VMs that failed due to the failure condition (e.g., a failure of the data center). Initiating the one or more VMs while initiating the host in this manner improves the stability of the system and the availability of the one or more VMs.

Once host 312 has been initiated, the availability manager may execute virtualization manager 316 on host 312 at data center 102b. As described, virtualization manager 316 may be a virtualization management process and manage VMs and/or hosts of the cloud computing system 100 on behalf of the failed virtualization manager 308a. In this way, the availability manager may compensate for the detected failure condition and ensure that an instance of the virtualization manager is executing in order to manage the necessary VMs and/or hosts of the cloud computing system 100. This increases the stability of cloud computing system 100 and provides for improved fault tolerance and process stability.

In some examples, data center 102b, and other data centers that belong to cloud computing system 100, maintain a failover capacity for one or more processes (e.g., virtualization management processes) executing on other data centers of cloud computing system 100. For example, data center 102b may be required to maintain failover capacity on one or more hosts equivalent to the amount of resources required to execute an instance of virtualization manager 308a, or another instance of a virtualization manager executing on another data center. In some examples, the availability manger initiates host 312 because the availability manger determines that data center 102b does not have adequate resources reserved to execute a new instance of a virtualization manager.

In some examples, once virtualization manager 316 is executing on host 312 at data center 102b, the availability manager determines a type of the failure condition that caused virtualization manager 308a to cease executing and resolves the failure condition, if possible. Once the failure condition has been resolved, the availability manger may execute a new instance of a virtualization manager on host 304a, or any other operable host of data center 102a. The availability manager may then cease the execution of virtualization manager 316 on host 312 and remove host 312 from operation, if no longer needed. In this way, the added resources are utilized when necessary, reducing overall operating costs. In some examples, host 312 may remain in operation as a dedicated host of data center 102b and used to execute an instance of a different virtualization manager, such as virtualization manager 308b, and/or one or more other processes.

In some examples, when virtualization manager 308a ceases executing, the availability manager may attempt to execute an instance of virtualization manager 308a (e.g., resume execution, reinitiate execution) at data center 102a. In some examples, the availability manager may attempt to execute virtualization manager 308a on the host on which it was previously executed (e.g., host 304a). In order to execute, virtualization manager 308a may require a specific amount of available resources, such as processing resources and/or storage resources.

In some examples, host 304a may experience a failure condition that does not allow for execution of virtualization manager 308a despite having reserved resources for execution of virtualization manager 308a. By way of example, the failure condition could be the failure of host 304a or a stall of virtualization manager 308a executing on host 304a. In some examples, when such a failure condition occurs, the availability manager attempts to execute a new instance of a virtualization manager on another host of data center 102(a). If virtualization manager 316 is able to execute on data center 102a, the new instance of the virtualization manager may operate on behalf of virtualization manager 308a. In this way, the stability of the cloud computing system 100 and the availability of VMs is improved. This leads to an increase in fault tolerance and the availability of the services provided.

Initiating hosts, virtual machines, and/or processes in the described manner allows for the flexible addition of hosts according to resource demands of the cloud computing environment 100. In this way, resources may be added as needed, increasing efficiency of cloud computing system 100. Rather than requiring one or more hosts to maintain dedicated failover capacity for each of the virtualization managers in the system, the system may add resources (e.g., hosts) as needed, for instance, in response to failure of a virtualization management process.

Further, because data centers are, in some instances, located in geographically and physically distinct locations, initiating a new host at a different data center of the cloud computing environment and executing a new instance of a virtualization manager on the initiated host allows the new instance of the virtualization manager to initiate and monitor VMs, even if the failure condition affects an entire data center. This provides greater stability across the system and increases VM availability, in turn leading to greater fault tolerance and greater service availability.

Figure 4A:
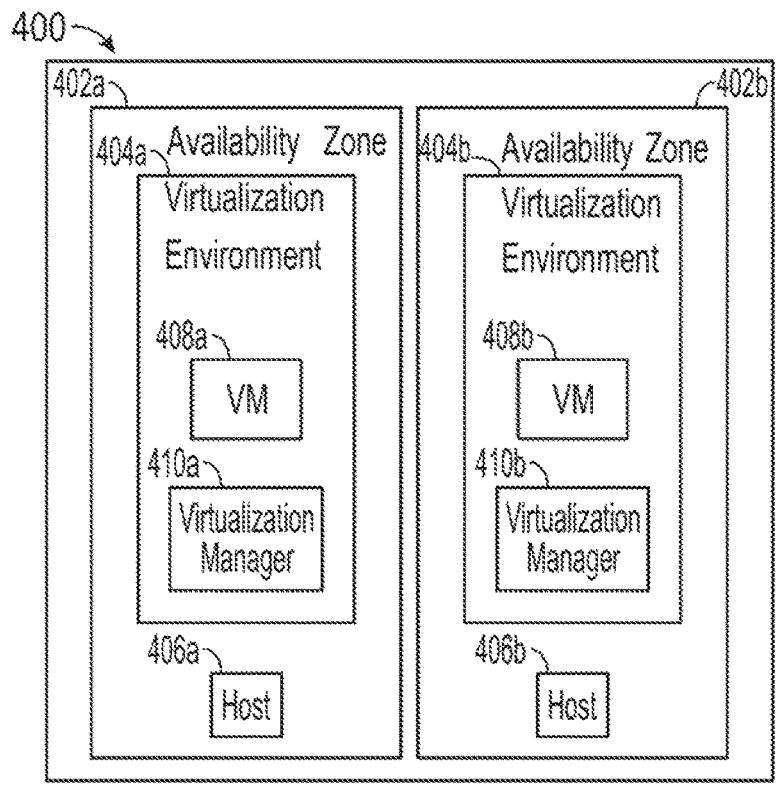
FIGS. 4A and 4B are block diagrams illustrating an exemplary virtual private cloud before and after a failure condition.
Figure 4B:
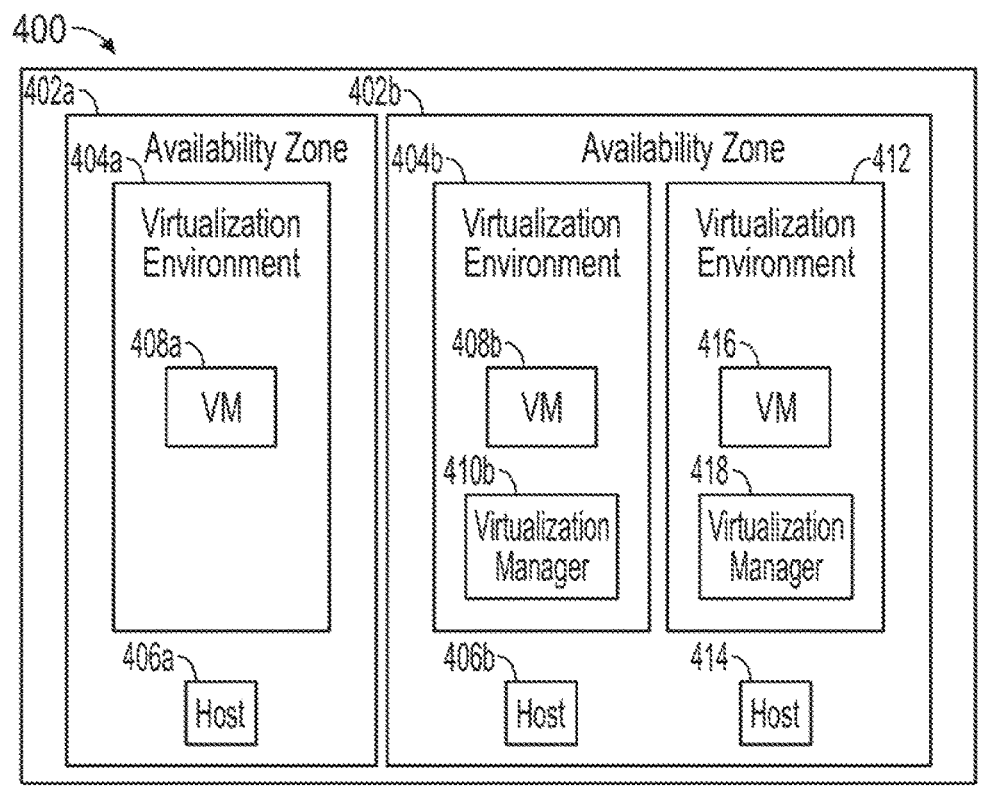

FIGS. 4A and 4B depict an exemplary virtual private cloud 400 (e.g., implemented as cloud computing system 100) in which certain examples discussed above may be utilized. A virtual private cloud (VPC) is a virtual network dedicated to a user account (e.g., an Amazon.com Inc., account). The VPC is isolated (e.g., logically isolated) from other networks, such as a network dedicated to another user's account) in the cloud (e.g., a cloud computing environment provided by Amazon Web Services). A user of VPC 400 can instantiate cloud resources, such as Amazon elastic container instances (e.g., configured to provide the processing, networking, memory, and/or storage resources discussed above) into the VPC.

In some examples, VPC 400 is associated with a region (e.g., a particular geographic location specified by a user, such as the West Coast of the United States, a state, a city, a country, etc.) The region includes one or more Availability Zones (e.g., AZ 402 and AZ 404 each respectively implemented as one or more data centers 102) that are each associated with distinct locations within the region. In some examples, VPC 400 includes all of the availability zones for a particular region. Although FIGS. 4A and 4B show VPC 400 including two AZs, it will be appreciated that VPC 400 can include any number of AZs and that the techniques discussed herein may be employed for a VPC having any number of AZs.

By launching instances in separate AZs, computing process(es) supported by the instances are protected from the failure of a single AZ. Further, it may be desirable for a process supported by the instances of one AZ to communicate with instances of another AZ (e.g., to provide failover and/or migration capability for processes between AZs).

In some examples, each AZ employs a virtualization manager (e.g., virtualization manager 410a, 410b) to manage hosts of the AZ and the VMs executing on the hosts. For example, AZ 402a, includes host 406a on which VM 408a and virtualization manager 410a are executed, and AZ 402b, includes host 406b on which VM 408b and virtualization manager 410b are executed.

During operation of VPC 400, it is desirable to maximize the uptime of one or more instances of a virtualization manager in order to allow continued access to the services provided by various VMs. Accordingly, a high availability module (e.g., an availability management process) of VPC 400 accounts for a variety of possible failure conditions that may occur during operation.

In some examples, the high availability module accounts for failure conditions by reserving failover capacity. However, in some examples, the high availability module may not understand the restrictions of the AZ's or that failover capacity should be reserved across different AZ's and thus may not be able to reserve the appropriate failover capacity on other AZ's of VPC 400.

In view of the above high availability module restrictions, it may be difficult for a computing process of one AZ to failover to another AZ, that is create a new instance of the computing process at another AZ after a failure of the current AZ. For example, if AZ 402a experiences a failure a new instance of virtualization manager 410a may not be able to be created at AZ 402b due to a lack of failover capacity at 402b (e.g., due to a lack of space on host 406b). In some examples, a failover may occur when an AZ is partitioned and the virtualization manager fails to execute on the surviving partition.

In some examples, it may be desirable for a virtualization manager to be able to failover between AZs. In some examples, such a failover may be enabled by initiating a new host to provide enough capacity to create a new instance of the virtualization manager. For example, after a failure is detected at AZ 402a, a new host 414 may be added to a surviving AZ 402b. A new instance of the failed virtualization manager (e.g., virtualization manager 418) may then be created on host 414. In some examples, host 414 may then be added to the cluster of hosts at AZ 402b.

In some examples, after host 414 is initiated and virtualization manager 418 is created any VMs that were executing prior to the failure (e.g., VM 408a) at AZ 402a may fail over as a new VM (e.g., VM 416) at AZ 402b. The capacity required to initiate the new VM's may be added to the system by using another computing process or module of VPC 400. For example, further capacity may be added by leveraging tools like an elastic distributed resource schedule which may add more capacity for the VM's as the capacity becomes available due to the shutdown of other VM's or processes.

Figure 5:
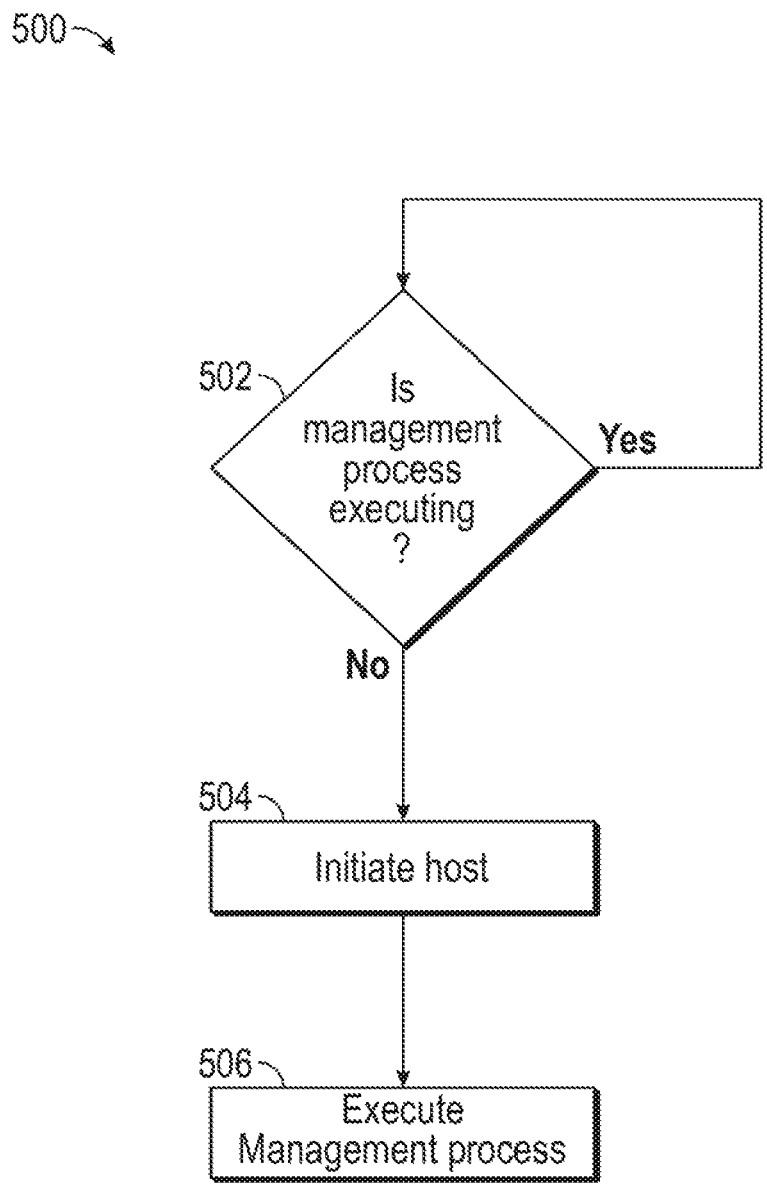
FIG. 5 is a flow chart of an exemplary process 500 for providing reserved failover capacity across a plurality of data centers.

FIG. 5 is a flow chart of an exemplary process 500 for providing reserved failover capacity across a plurality of data centers. In some examples, process 500 is performed by a management process (e.g., an availability manager) on a host (e.g., any one of hosts 104a, 104b of FIG. 1, host 200 of FIG. 2, hosts 308a, 308b of FIG. 3). It should be recognized that in other examples, process 500 can be implemented using a single host of a cloud computing system, or can be implemented using multiple hosts of a cloud computing system. It should also be recognized that although the blocks of process 500 are depicted in a particular order in FIG. 5, these blocks can be performed in other orders. Further, one or more blocks of process 500 can be optional and/or additional blocks can be performed.

At block 502, the availability manager determines whether a management process (e.g., virtualization manager 308a) is executing. In some examples, the availability manager determines whether a management process is executing at a first data center corresponding to a first physical location (e.g., data center 102a). In some examples, in response to determining that the management process is executing, the availability manager periodically determines if the management process is executing.

At block 504, in accordance with a determination that the management process (e.g., virtualization manager 308a) is not executing, a host (e.g. host 312) is initiated. In some examples, the availability manager determines that the management process is not executing at a first data center corresponding to a first physical location (e.g., data center 102a). In some examples, the host is initiated at a second data center corresponding to a second physical location (e.g., data center 102b). In some examples, the availability manager determines whether the management process is not executing due to a first failure condition or a second failure condition. In some examples, the first failure condition is either a lack of failover capacity, a loss of network connection, or a failure of the first data center corresponding to the first physical location. In some examples, the second failure condition is a failure of the previous host or a stall of the management process. In some examples, in accordance with a determination that the management process at the first data center is not executing due to the second failure condition, the instructions forgo initiating the host at the second data center corresponding to the second location.

In some examples, initiating the host (e.g., host 312) includes initiating one or more virtual machines (e.g., virtual machine 314). In some examples, initiating one or more virtual machines occurs at the second data center corresponding to the second physical location (e.g., data center 102b).

At block 506, a new instance of the management process (e.g., virtualization manager 316) is executed on the initiated host (e.g., host 312). In some examples, the new instance of the management process is executed on the initiated host located at the second data center corresponding to the second physical location (e.g., data center 102b). In some examples, executing the management process (e.g., virtualization manager 316) on the initiated host at the second data center corresponding to the second physical location includes executing the management process on the one or more initiated virtual machines.

In some examples, the availability manager determines if the first failure condition has been resolved. In accordance with a determination that the first failure condition has been resolved, a new instance of the management process (e.g., virtualization manager 308a) is executed on a host (e.g. host 304a) at the first data center corresponding to the first physical location (e.g., data center 102a). Further, the availability manager ceases execution of the old instance of the management process (e.g., virtualization manager 316) on the initiated host (e.g., host 312) at the second data center corresponding to the second physical location (e.g., data center 102b). The availability manager then removes initiated host from the second data center corresponding to the second physical location.

In some examples, the availability manager reserves resources equivalent to a resource requirement of the management process (e.g., virtualization manager 308a) at a data center (e.g., data center 102b). In some examples, reserving resources equivalent to a resource requirement of the management process includes reserving resources equivalent to a resource requirement of the management process at the second data center corresponding to the second physical location.

In some examples, initiating the host (e.g., host 312) at the second data center corresponding to the second physical location (e.g., data center 102b) includes allocating at least one of processing resources (e.g., processors 206) or storage resources (e.g., memory 204). In some examples, allocating at least one of processing resources or storage resources includes requesting resources based on the resource requirement of the new instance of the management process (e.g., virtualization manager 316).

In some examples, the management process (e.g., virtualization managers 410a, 410b, 418) is configured to execute in a virtual private cloud (e.g., virtual private cloud 400). In some examples, the first data center corresponding to the first physical location (e.g., data center 102a) is associated with a first availability zone (e.g., availability zone 402a).

Certain embodiments as described above may be utilized to support failing over operations in a virtual private cloud including multiple availability zones. Existing high availability modules do not understand AZs, and therefore cannot ensure reserved failover capacity is appropriately spread across those AZs. In one embodiment, the proposed method works as follows. In the event of an AZ failure/partition, if a virtualization manager isn't on the victor/surviving partition, the method includes injecting a new host into the cluster, then use it to spin up a virtualization manager and any failed network edges. Once they are up, we can add that new host to the cluster. Then the method includes then leveraging elastic distributed resource scheduling to dynamically add more capacity until there is enough to failover the remaining VMs.

The foregoing descriptions of specific examples have been presented for purposes of illustration and description. They are not intended to be exhaustive or to limit the scope of the claims to the precise forms disclosed, and it should be understood that many modifications and variations are possible in light of the above teaching.

What is claimed is:

1. A method for providing reserved failover capacity across a plurality of data centers, the method comprising:
    determining whether a management process is executing at a first data center corresponding to a first physical location;
    reserving resources equivalent to a resource requirement of the management process at a second data center corresponding to a second physical location;

in accordance with a determination that the management process is not executing at the first data center corresponding to the first physical location:
initiating a host at the second data center corresponding to the second physical location; and
executing the management process on the initiated host at the second data center corresponding to the second physical location.

2. The method of claim 1, wherein determining whether the management process is not executing at the first data center corresponding to the first physical location includes determining if the management process is not executing due to a first failure condition or a second failure condition.

3. The method of claim 2, further comprising:
in accordance with a determination that the management process at the first data center corresponding to the first physical location is not executing due to the second failure condition:
forgoing initiating the host at the second data center corresponding to the second location.

4. The method of claim 2, wherein the first failure condition is a lack of failover capacity, a failure of the first data center corresponding to the first physical location, or a loss of network connection.

5. The method of claim 2, wherein the second failure condition is a failure of a previous host or a stall of the management process.

6. The method of claim 2, further comprising:
determining if the first failure condition has been resolved;
in accordance with a determination that the first failure condition has been resolved:
executing the management process on a host at the first data center corresponding to the first physical location;
ceasing execution of the management process on the initiated host at the second data center corresponding to the second physical location; and
removing the initiated host at the second data center corresponding to the second physical location.

7. The method of claim 1, wherein initiating the host at the second data center corresponding to the second physical location includes initiating one or more virtual machines.

8. The method of claim 7, wherein executing the management process on the initiated host at the second data center corresponding to the second physical location includes executing the management process on the one or more initiated virtual machines.

9. The method of claim 1, wherein initiating the host at the second data center corresponding to the second physical location includes allocating at least one of processing resources or storage resources.

10. The method of claim 9, wherein allocating the at least one of processing resources or storage resources includes requesting resources based on the resource requirement of the management process.

11. The method of claim 1, wherein the management process is configured to execute in a virtual private cloud.

12. The method of claim 1, wherein the first data center corresponding to the first physical location is associated with a first availability zone.

13. One or more non-transitory computer readable storage media storing one or more programs, the one or more programs comprising instructions for providing reserved failover capacity across a plurality of data centers, which when executed by one or more processors of an electronic device, cause the electronic device to:
determine whether a management process is executing at a first data center corresponding to a first physical location;
reserve resources equivalent to a resource requirement of the management process at a second data center corresponding to a second physical location;
in accordance with a determination that the management process is not executing at the first data center corresponding to the first physical location:
initiate a host at the second data center corresponding to the second physical location; and
execute the management process on the initiated host at the second data center corresponding to the second physical location.

14. The non-transitory computer readable storage media of claim 13, wherein determining whether the management process is not executing at the first data center corresponding to the first physical location includes determining if the management process is not executing due to a first failure condition or a second failure condition.

15. The non-transitory computer readable storage media of claim 14, wherein the instructions, which when executed by the electronic device, further cause the electronic device to:
determine if the first failure condition has been resolved;
in accordance with a determination that the first failure condition has been resolved:
execute the management process on a host at the first data center corresponding to the first physical location;
cease execution of the management process on the initiated host at the second data center corresponding to the second physical location; and
remove the initiated host at the second data center corresponding to the second physical location.

16. The non-transitory computer readable storage media of claim 14, wherein the instructions, which when executed by the electronic device, further cause the electronic device to:
in accordance with a determination that the management process at the first data center corresponding to the first physical location is not executing due to the second failure condition:
forgo initiating the host at the second data center corresponding to the second location.

17. The non-transitory computer readable storage media of claim 14, wherein the first failure condition is a lack of failover capacity, a failure of the first data center corresponding to the first physical location, or a loss of network connection.

18. The non-transitory computer readable storage media of claim 14, wherein the second failure condition is a failure of a previous host or a stall of the management process.

19. The non-transitory computer readable storage media of claim 13, wherein initiating the host at the second data center corresponding to the second physical location includes initiating one or more virtual machines.

20. The non-transitory computer readable storage media of claim 19, wherein executing the management process on the initiated host at the second data center corresponding to the second physical location includes executing the management process on the one or more initiated virtual machines.

21. The non-transitory computer readable storage media of claim 13, wherein initiating the host at the second data center corresponding to the second physical location includes allocating at least one of processing resources or storage resources.

22. The non-transitory computer readable storage media of claim 21, wherein allocating the at least one of processing resources or storage resources includes requesting resources based on the resource requirement of the management process.

23. The non-transitory computer readable storage media of claim 13, wherein the management process is configured to execute in a virtual private cloud.

24. The non-transitory computer readable storage media of claim 13, wherein the first data center corresponding to the first physical location is associated with a first availability zone.

25. A system, comprising:
one or more processors; and
memory storing one or more programs configured to be executed by the one or more processors for providing reserved failover capacity across a plurality of data centers, the one or more programs including instructions for:
determining whether a management process is executing at a first data center corresponding to a first physical location;
reserving resources equivalent to a resource requirement of the management process at a second data center corresponding to a second physical location;
in accordance with a determination that the management process is not executing at the first data center corresponding to the first physical location:
initiating a host at the second data center corresponding to the second physical location; and
executing the management process on the initiated host at the second data center corresponding to the second physical location.

26. The system of claim 25, wherein determining whether the management process is not executing at the first data center corresponding to the first physical location includes determining if the management process is not executing due to a first failure condition or a second failure condition.

27. The system of claim 26, the one or more programs further including instructions for:
determining if the first failure condition has been resolved;
in accordance with a determination that the first failure condition has been resolved:
executing the management process on a host at the first data center corresponding to the first physical location;
ceasing execution of the management process on the initiated host at the second data center corresponding to the second physical location; and
removing the initiated host at the second data center corresponding to the second physical location.

28. The system of claim 26, the one or more programs further including instructions for:
in accordance with a determination that the management process at the first data center
corresponding to the first physical location is not executing due to the second failure condition:
forgoing initiating the host at the second data center corresponding to the second location.

29. The system of claim 26, wherein the first failure condition is a lack of failover capacity, a failure of the first data center corresponding to the first physical location, or a loss of network connection.

30. The system of claim 26, wherein the second failure condition is a failure of a previous host or a stall of the management process.

31. The system of claim 25, wherein initiating the host at the second data center corresponding to the second physical location includes initiating one or more virtual machines.

32. The system of claim 31, wherein executing the management process on the initiated host at the second data center corresponding to the second physical location includes executing the management process on the one or more initiated virtual machines.

33. The system of claim 25, wherein initiating the host at the second data center corresponding to the second physical location includes allocating at least one of processing resources or storage resources.

34. The system of claim 33, wherein allocating the at least one of processing resources or storage resources includes requesting resources based on the resource requirement of the management process.

35. The system of claim 25, wherein the management process is configured to execute in a virtual private cloud.

36. The system of claim 25, wherein the first data center corresponding to the first physical location is associated with a first availability zone.

* * * * *